J. FITTS.
Machine for Cleaning Cotton, Grain, &c.

No. 204,805. Patented June 11, 1878.

WITNESSES
Mary F. Utley
Villette Anderson

INVENTOR
John Fitts,
by E. W. Anderson,
ATTORNEY

UNITED STATES PATENT OFFICE.

JOHN FITTS, OF TUSCALOOSA, ALABAMA.

IMPROVEMENT IN MACHINES FOR CLEANING COTTON, GRAIN, &c.

Specification forming part of Letters Patent No. 204,805, dated June 11, 1878; application filed September 1, 1877.

*To all whom it may concern:*

Be it known that I, JOHN FITTS, of Tuscaloosa, in the State of Alabama, have invented a new and valuable Improvement in Machines for Cleaning Cotton and Small Grain; and I do hereby declare that the following is a full, clear, and exact description of the construction and operation of the same, reference being had to the annexed drawings, making a part of this specification, and to the letters and figures of reference marked thereon.

Figure 1:
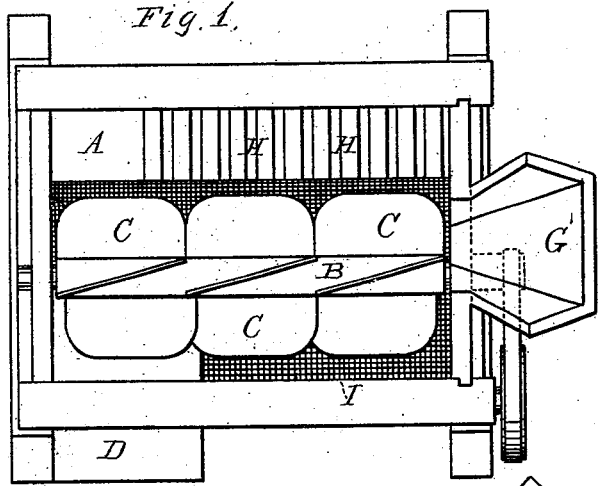
Figure 2:
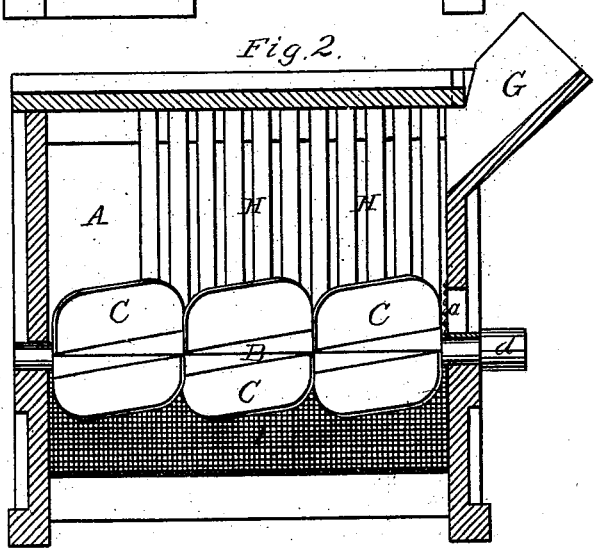
Figure 3:
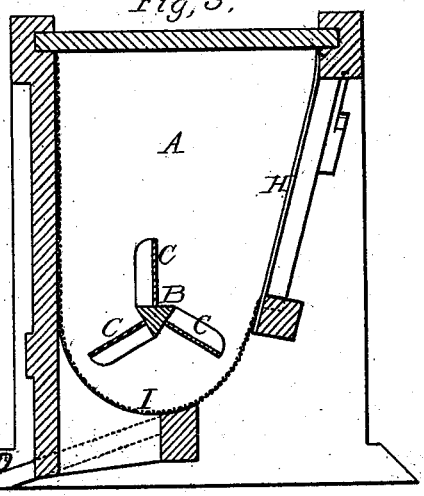

Figure 1 of the drawings is a representation of a plan view of the invention. Fig. 2 is a vertical longitudinal section, and Fig. 3 is a vertical transverse section of the same.

My invention consists in combining with the beating-shaft of a cotton-cleaner, having spirally-set wings, the head or end casing formed with an aperture at the end of said shaft for the ingress of air, as will be hereinafter more fully shown and described.

In the drawing, A represents the body or cleaning-chamber of a cotton, grain, and seed cleaning machine. Near the bottom of said chamber is longitudinally arranged a triangular shaft, B, journaled in bearings in the end walls of said chamber, and having its projecting end provided with an ordinary belt-pulley, $d$. Upon the flat sides of this triangular shaft are obliquely-arranged broad wings C. When the shaft and wings are rotated toward the right in the operation of cleaning, the material operated upon is gradually driven toward the discharge-spout D, owing to the oblique positions of the wings C, and by reason of the breadth of said wings there is less breakage of cotton fiber and bruising of grain and seed than are incidental to the operation of machines using the ordinary small-armed beaters, in which many edges and angles or small curved faces strike the material being cleaned. The wings C act also as fans and create a draft through the chamber, the air entering through the wire-gauze-covered ventilating-aperture $a$ in the end wall of the chamber A. The angular shaft serves materially to assist the operation at the center of the mass, where it is most sluggish and least under the control of the beating-flanges.

The stock to be cleaned is fed into the cleaning-chamber through a hopper, G, and, as it is agitated by the rotary motion of the wings C, the dirt and trash are separated therefrom, and the lighter portions thereof are thrown out through the openings between the slats H, while the heavier dirt falls through the wire-netting bed I of the chamber.

In cleaning cotton I prefer to use wings about two feet long, and, say, one foot wide; but shorter wings may be used with advantage in cleaning small grain and seed.

The shaft may be four-sided, or may have any suitable number of sides, to each of which wings may be attached, and wings might, of course, be attached to a round shaft; but flat-sided shafts are preferable on account of the convenience with which wings may be attached thereto.

Having now fully described the construction of my invention and explained the operation thereof, I claim—

In combination with the beating-shaft of a cotton-cleaner, having spirally-set wings, the head or end casing formed with an aperture at the end of said shaft for the ingress of air, substantially as specified.

In testimony that I claim the above I have hereunto subscribed my name in the presence of two witnesses.

JOHN FITTS.

Witnesses:
 MONROE DONOHO,
 N. H. BROWNE.